United States Patent [19]

Bagepalli et al.

[11] Patent Number: 5,265,412
[45] Date of Patent: Nov. 30, 1993

[54] SELF-ACCOMMODATING BRUSH SEAL FOR GAS TURBINE COMBUSTOR

[75] Inventors: Bharat S. Bagepalli, Schenectady; Osman S. Dinc, Troy; John Barnes, Schenectady, all of N.Y.

[73] Assignee: General Electric Company, Schenectady, N.Y.

[21] Appl. No.: 920,879

[22] Filed: Jul. 28, 1992

[51] Int. Cl.⁵ .................................. F02C 7/20
[52] U.S. Cl. ...................... 60/39.32; 277/53; 415/134
[58] Field of Search ............ 60/39.31, 39.32, 752; 415/134, 137, 138; 277/53, 55

[56] References Cited

U.S. PATENT DOCUMENTS

| | | | |
|---|---|---|---|
| 2,709,338 | 5/1955 | Morley et al. | 60/39.32 |
| 3,186,168 | 6/1965 | Ormerod et al. | 60/39.32 |
| 3,463,498 | 8/1969 | Bill | 60/39.32 |
| 3,759,038 | 9/1973 | Scalzo et al. | 60/39.32 |
| 4,195,476 | 4/1980 | Wood | 60/39.32 |
| 4,202,554 | 5/1980 | Snell | 277/53 |
| 4,358,120 | 11/1982 | Moore | 277/53 |
| 4,422,288 | 12/1983 | Steber | 60/39.32 |
| 4,567,730 | 2/1986 | Scott | 60/757 |
| 4,781,388 | 11/1988 | Wohrl et al. | 277/53 |
| 4,785,623 | 11/1988 | Reynolds | 60/39.32 |
| 4,901,522 | 2/1990 | Commaret et al. | 60/39.32 |
| 5,074,748 | 12/1991 | Hagle | 277/53 X |
| 5,076,590 | 12/1991 | Steinetz et al. | 277/53 |
| 5,090,710 | 2/1992 | Flower | 277/53 |
| 5,106,104 | 4/1992 | Atkinson et al. | 277/1 |
| 5,114,159 | 5/1992 | Baird et al. | 277/53 |

FOREIGN PATENT DOCUMENTS

| | | | |
|---|---|---|---|
| 0453315 | 10/1991 | European Pat. Off. | 277/53 |
| 2938484 | 3/1981 | Fed. Rep. of Germany . | |
| 0421302 | 5/1987 | Italy | 277/53 |

Primary Examiner—Richard A. Bertsch
Assistant Examiner—Michael I. Kocharov
Attorney, Agent, or Firm—Nixon & Vanderhye

[57] ABSTRACT

The gas turbine includes a combustor 10 having a transition piece 18 with its exit end spaced from a first-stage nozzle 22. A brush seal 26 seals about the space between the transition piece and first-stage nozzle. The brush seal includes a sealing cap 28 supported by one of the transition piece and the first-stage nozzle and having a portion 38 overlying the other of the transition piece and first-stage nozzle. A seal ring 30 is secured to the other of the transition piece and the first-stage nozzle and carries bristles 32 projecting therefrom for engagement with the overlying portion 38 of the sealing cap 28 to seal the gap between the transition piece and the first-stage nozzle.

11 Claims, 3 Drawing Sheets

SELF-ACCOMMODATING BRUSH SEAL FOR GAS TURBINE COMBUSTOR

TECHNICAL FIELD

The present invention relates to brush seals and particularly relates to brush seals for use in sealing the space between combustor transition pieces and the first-stage nozzle in a gas turbine.

BACKGROUND

In gas turbines, a plurality of combustors are conventionally disposed in an annular array about the axis of the machine. Hot gases of combustion flow from each combustor through a transition piece into the first-stage nozzle. Because the transition pieces and the first-stage nozzle are formed of different materials and are subjected to different temperatures during operation, they experience different degrees of thermal growth. That is, both the transition pieces and the first-stage nozzle support elements move radially, circumferentially and axially relative to one another as a result of thermal growth. Also, similar relative movement occurs as a result of the dynamic pulsing of the combustion process. Thus, the time-variable mismatch at the junction of the transition pieces and the first-stage nozzle support elements, as a result of the thermal growth and dynamic spacing of these elements, requires an effective seal to contain the combustion products and the pressure differential across this space, while accommodating these dimensional changes in the radial, circumferential and axial directions.

Prior seals between transition pieces and first-stage nozzle elements typically have included relative rigid angled brackets for the top and bottom of the first-stage nozzle and a block of grooved metal that has lips that mesh with the corresponding grooves in each transition piece or the first-stage nozzle. Relative motion and thermal growth between the transition pieces and the first-stage nozzle are accommodated by the free movement of these parts, although such movement is limited by the lip-and-groove arrangement. Excessive wear of the mating parts in this type of seal occurs and necessitates undesirable frequent inspection intervals and shutdown for replacement.

Brush seals have been utilized in many environments in the past, usually between a stationary part and a rotating element. In U.S. Pat. No. 4,781,388, however, there is disclosed a brush seal for use in a gas turbine for sealing between relatively stationary parts and to accommodate dimensional differences caused by thermal growth and the dynamics of the system. However, the disclosed brush seals require a receiving element in the form of a fork for confining the distal ends of the bristles. Moreover, they are not used in sealing the space between combustion transition pieces and first-stage nozzles.

DISCLOSURE OF INVENTION

In the present invention, there is provided a brush seal for sealing between the transition pieces and the first-stage nozzle in a gas turbine. The brush seal includes a sealing cap for enclosing the end of the transition piece. The sealing cap is preferably disposed in a groove in the first-stage nozzle and includes a portion which projects into overlying relation with a channel formed along the outside of the transition piece. A seal ring is disposed in the channel and carries a plurality of densely packed bristles which project outwardly from the seal ring for engagement of their distal ends or tips against the overlying cap portion. The bristles are maintained in the seal ring either by a press, i.e., a frictional retention by clamping a pair of ring plates together, or by welding the proximal ends of the bristles along the underside of one or both of the ring plates constituting the opposite sides of the seal ring.

The seal ring and sealing cap may each be formed unitarily of a single component piece or may each be comprised of discrete segments connected to one another. Alternatively, one may be unilaterally formed while the other is formed from discrete segments. A spring clip is disposed in the channel for urging the seal ring against one of the channel walls to prevent the differential pressure across the seal from flowing fluid between the seal ring and channel and bypassing the seal. With the foregoing described construction, the seal ring disposed in the transition piece channel and the bristles extending from the seal ring move with the transition piece as a result of its dynamic motion or thermal growth, or both. The bristles also accommodate movement of the first-stage nozzle elements relative to the transition piece. Thus, the brush seal hereof enables a time-varying contact of the bristles along the sealing cap, thereby effectively sealing the juncture between the transition piece and the first-stage nozzle, notwithstanding radial, axial or circumferential relative movement of the two parts and time varying differential spacing therebetween.

Alternatively, the sealing cap may be disposed in the channel of the transition piece and the seal ring disposed in a groove in the first-stage nozzle. The bristles, of course, project from the seal ring to engage against a portion of the sealing cap.

In a preferred embodiment according to the present invention, there is provided a gas turbine comprising a first-stage nozzle, a combustor having a transition piece for flowing hot gases of combustion from the combustor to the first-stage nozzle, the transition piece being spaced from the first-stage nozzle and a brush seal between the transition piece and the first-stage nozzle sealing the space therebetween. The brush seal includes a sealing cap carried by one of the transition piece and the first-stage nozzle, the sealing cap having a portion overlying the other of the transition piece and the first-stage nozzle and defining a gap therewith. The brush seal further includes a seal ring carrying a plurality of brush bristles projecting outwardly beyond an edge portion of the ring across the gap and having tips free for engaging the overlying portion of the sealing cap. Means are carried by the other of the transition piece and the first-stage nozzle for mounting the seal ring thereon such that the bristles extend across the gap to seal the space between the transition piece and the first-stage nozzle.

Accordingly, it is a primary object of the present invention to provide a novel and improved brush seal for effectively sealing the space between the transition pieces and the first-stage nozzle in a gas turbine combustor.

BEST MODE FOR CARRYING OUT THE INVENTION

Reference will now be made in detail to a present preferred embodiment of the invention, an example of which is illustrated in the accompanying drawings.

Figure 1:
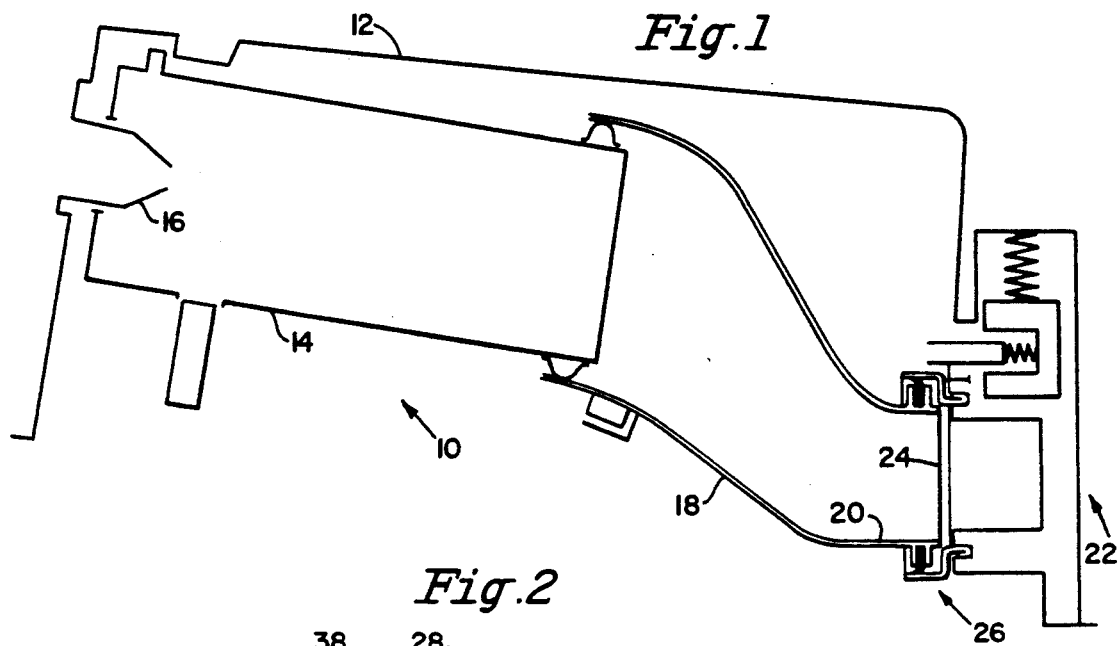
FIG. 1 is a schematic illustration of a combustor for a gas turbine with a brush seal between its transition piece and a first-stage nozzle according to the present invention.

Referring now to the drawings, particularly to FIG. 1, there is schematically illustrated a combustor, generally designated 10, for a gas turbine and which combustor generally includes a flow sleeve 12, a liner 14, a nozzle 16 and a transition piece 18. At the exit end 20 of the transition piece 18, a first-stage nozzle, generally designated 22, is provided for receiving the hot gases of combustion from the combustor. The combustor 10 may be conventional in construction and further description thereof is not believed necessary. Suffice to say that, in a gas turbine, there are a plurality of combustors disposed in an annular array, each coupled with a corresponding transition piece 18 similarly disposed in an annular array about the axis of the turbine for flowing hot gases of combustion through the first-stage nozzle and downstream to the buckets.

FIG. 1 also illustrates, at 24, the space between the exit end of transition piece 18 and the first-stage nozzle 22. Because these latter elements are of different configuration relative to one another, are formed of different materials and are subjected to different temperatures, it will be appreciated that there is relative movement between the exit end of transition piece 18 and the first-stage nozzle 22 in radial, circumferential and axial directions in response to the dynamics of the combustor and thermal growth. The present invention provides a brush seal between the transition piece and the first-stage nozzle which are generally considered non-movable, except for the slight movement caused by the dynamics of the combustor and thermal growth. The brush seal is generally designated 26 in FIG. 1 and seals the space 24 by accommodating such movement.

Figure 2:
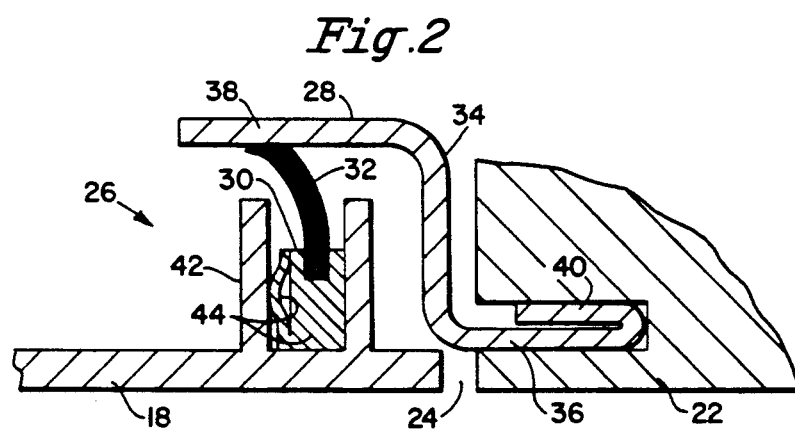
FIG. 2 is an enlarged fragmentary cross-sectional view illustrating the brush seal between the transition piece and the first-stage nozzle.
Figure 3:
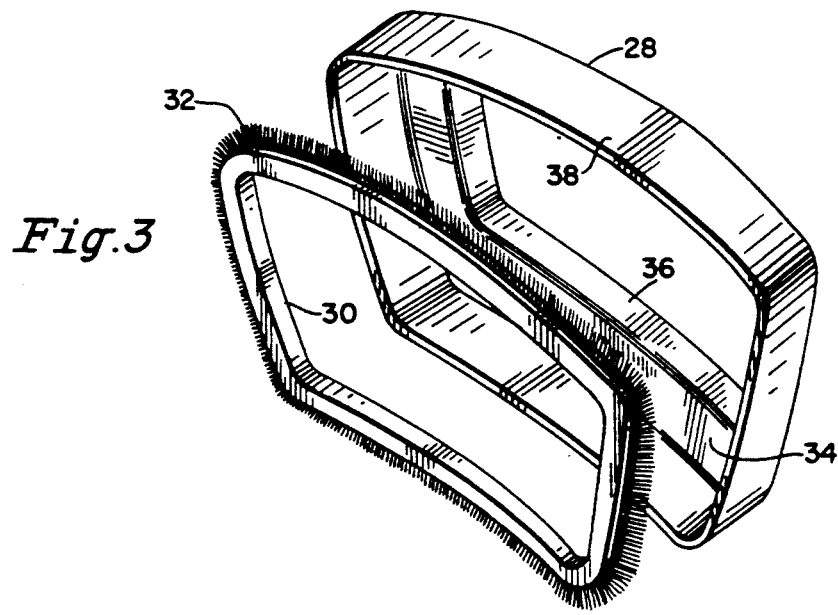
FIG. 3 is a perspective view illustrating the sealing cap and seal ring.

Referring now to FIG. 2, brush seal 26 includes a sealing cap 28 and a seal ring 30 having bristles 32 projecting outwardly from the seal ring 30. In this illustrated form of the brush seal, the sealing cap 28 is generally formed of a single unitary part having a generally Z-shaped cross-section, as illustrated in FIG. 2, with an intermediate portion 34 and opposite end portions 36 and 38. End portion 36 has a reversely turned flange 40 and the end portion 36 and flange 40 are received in an axially rearwardly extending groove formed in the first-stage nozzle 22. The opposite end portion 38 of sealing cap 28 overlies seal ring 30 and also encompasses the exit end of the transition piece.

Figure 4:
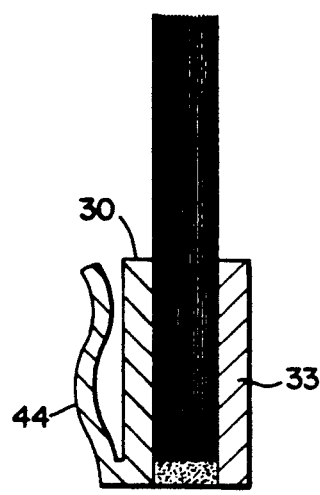
FIG. 4 is an enlarged cross-sectional view illustrating one form of connector between the brush seal bristles and the seal ring.

Transition piece 18 has an outwardly opening channel 42 about its periphery for receiving the seal ring 30 and which channel 42 lies in spaced opposition to the overlying end portion 38 of cap 28. Seal ring 30 may include a base having a groove for mounting bristles 32 or, as in FIG. 4, may comprise a pair of plates 33 suitably clamped one to the other with the proximal ends of the bristles 32 frictionally retained between the plates. It will be appreciated that the distal ends of bristles 32 engage against the overlying end portion 38 to form a seal for the space 24. A spring clip 44 is provided on the back side of the base of the seal ring 30 to bias the base rearwardly into engagement against one of the walls defining the channel. In this manner, the fluid in space 24 cannot bypass the seal provided by bristles 32.

Figure 5:
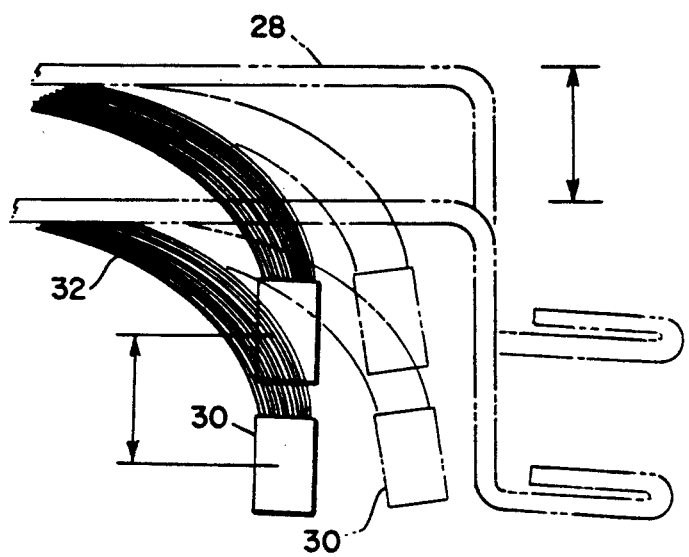
FIG. 5 is a schematic illustration of the movement of the elements of the brush seal in response to relative displacement of the transition piece and first-stage nozzle.

As indicated previously, transition piece 18 and first-stage nozzle 22 are movable relative to one another and hence both carry their respective seal ring 30 and sealing cap 28 for movement therewith, as illustrated in FIG. 5. In FIG. 5, seal ring 30 is illustrated in two radial and axially displaced positions in conjunction with a radial displacement of the sealing cap 20. It will be appreciated that a relative circumferential movement may likewise occur. It will also be appreciated that bristles 32 engage the overlying end portion 38 of the sealing cap 28 for all relative displacements of the transition piece 18 and first-stage nozzle 22. Bristles 32, in all embodiments hereof, may be formed of a high temperature-resistant metal alloy, such as the nickel-based alloy identified as Hastalloy-X.

Figure 6:
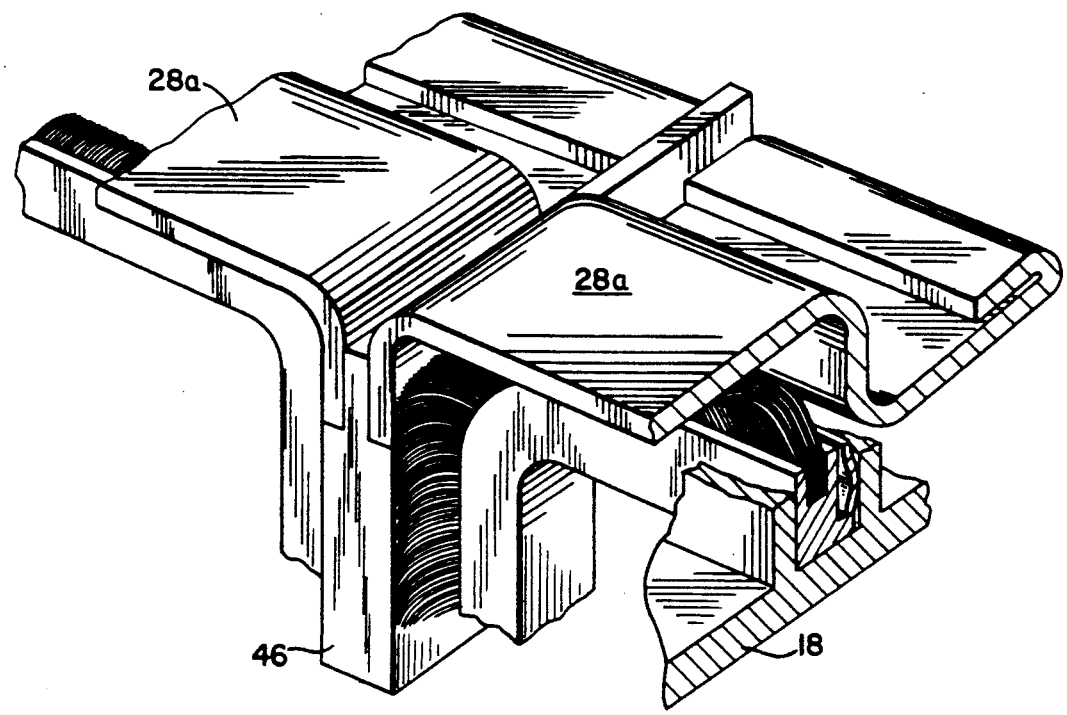
FIG. 6 is a fragmentary perspective view of a further embodiment of a brush seal according to the present invention.
Figure 7:
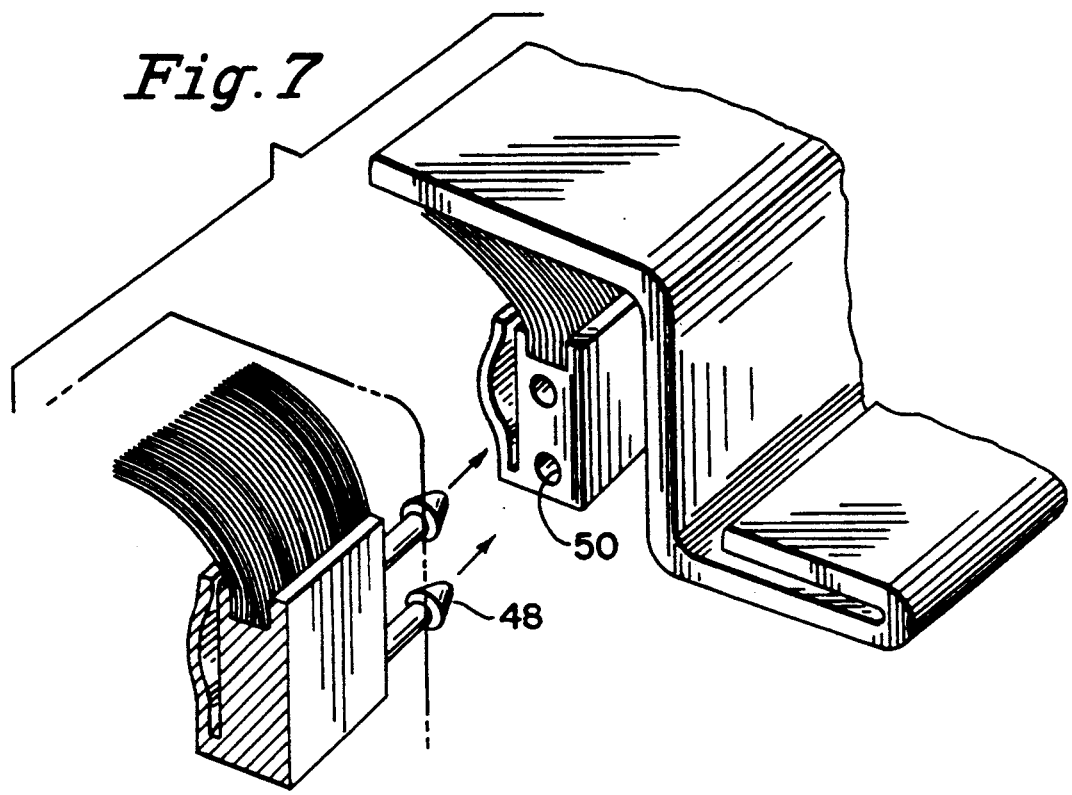
FIG. 7 is a fragmentary perspective view of the brush seal illustrating the manner in which seal ring segments may be secured one to the other.

While in the embodiments of FIGS. 1 through 5, both the seal ring and sealing cap are formed of integral parts defining complete enclosures about the transition piece or first-stage nozzle, respectively, the seal ring and sealing cap may be formed of seal ring segments and sealing cap segments, respectively. This is illustrated in FIGS. 6 and 7. For example, in FIG. 6, the sealing cap 28a for each transition piece of the illustrated adjoining transition pieces has top and bottom segments, only the top segments of the sealing caps 28a being illustrated. While each sealing cap 28a may have a pair of opposite side segments, a common side segment 46 for the circumferentially adjoining transition pieces may be provided in lieu thereof. The base of the seal ring may likewise be provided in seal ring segments. For example, as illustrated in FIG. 7, the seal ring may be divided into top, bottom and opposite side seal ring segments with the individual segments suitably joined one to the other. Pins 48 may be provided for reception in sockets 50 in the adjoining seal ring segment to secure the seal ring segments one to the other.

Figure 8:
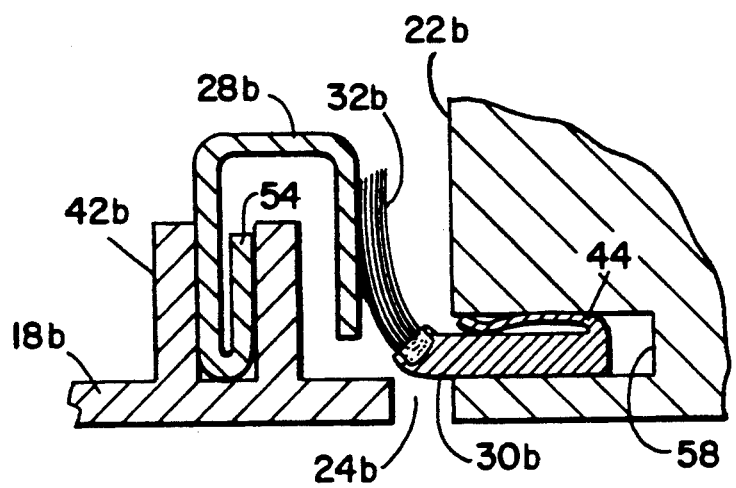
FIG. 8 is an enlarged cross-sectional view illustrating a further embodiment of the brush seal hereof.

Referring now to the embodiment hereof illustrated in FIG. 8, a transition piece 18b carries an outwardly projecting channel 42b and is in opposition to a first-stage nozzle 22b. The sealing cap 28b, in this embodiment, however, is generally in the form of a channel with one of the channel legs having a reversely bent flange 54 such that the one channel leg with the flange 54 may be received within the channel 42b of the transition piece 18b. The seal ring 30b with its accompanying spring clip 44b may be disposed in a rearwardly axially extending groove 58 formed in and about the first-stage nozzle 22b. The bristles 32b extend rearwardly from the seal ring 30b for engagement against the other and opposite leg of the channel-shaped seal ring 28b. Thus, the gap 24b between the transition piece 18b and the first-stage nozzle 22b is sealed by the sealing ring, with the reversely turned flange 54 engaging a wall of channel 42b to prevent flow of fluid around the seal.

While the invention has been described with respect to what is presently regarded as the most practical embodiments thereof, it will be understood by those of ordinary skill in the art that various alterations and modifications may be made which nevertheless remain within the scope of the invention as defined by the claims which follow.

What is claimed is:

1. A gas turbine comprising:
    a first-stage nozzle;
    a combustor having a transition piece for flowing hot gases of combustion from said combustor to said first-stage nozzle, said transition piece being spaced from said first-stage nozzle;
    a brush seal between said transition piece and said first-stage nozzle sealing the space therebetween, said brush seal including a sealing cap carried by said first stage nozzle, said sealing cap having a first portion angularly related to a second portion and a third portion angularly related to said second portion and overlying said transition piece and defining a gap therewith, said brush seal further including a seal ring carrying a plurality of brush bristles projecting outwardly beyond an edge portion of said ring across said gap and having tips free for engaging said overlying third portion of said sealing cap; and
    means carried by said transition piece for mounting said seal ring thereon such that said bristles extend across said gap to seal said space between said transition piece and said first-stage nozzle, said transition piece having a pair of walls projecting outwardly therefrom and in spaced opposition to said third portion of said sealing cap overlying said transition piece, said seal ring being disposed between said walls with the bristles carried thereby projecting outwardly of said walls with the tips engaging said overlying cap portion.

2. A gas turbine according to claim 1 wherein said transition piece and said first-stage nozzle are movable relative to one another as a result of thermal growth to alter the spacing therebetween, said brushes having sufficient length to seal between said transition piece and said first-stage nozzle throughout their relative movement.

3. A gas turbine according to claim 1 wherein said mounting means includes a pair of discrete plates spaced one from the other for receiving the end portions of said bristles opposite the free tips thereof.

4. A gas turbine according to claim 3 wherein said plates are pressed together with the bristles therebetween to frictionally clamp and retain said bristles between said plates.

5. A gas turbine according to claim 3 wherein the end portions of said bristles are welded one to the other and to at least one of said plates.

6. A gas turbine according to claim 1 including means for biasing said seal ring against one of said walls.

7. A gas turbine according to claim 1 wherein said sealing cap forms a complete enclosure for an end portion of said transition piece and is formed unitarily as a single part.

8. A gas turbine according to claim 1 wherein said sealing cap forms a complete enclosure for an end portion of said transition piece and is formed of a plurality of sealing cap segments joined one to the other to form said enclosure.

9. A gas turbine according to claim 1 including a pair of combustors each having a transition piece for flowing hot gases of combustion from said combustor to said first-stage nozzle, each combustor being spaced from said first-stage nozzle with said combustors and said transition pieces being circumferentially spaced one from the other, a sealing cap carried by each of said transition pieces, with each sealing cap being formed of a plurality of sealing cap segments joined one to the other to form an enclosure about the transition piece, one of the sealing cap segments being common to the circumferentially spaced transition pieces.

10. A gas turbine comprising:
    a first-stage nozzle;
    a combustor having a transition piece for flowing hot gases of combustion from said combustor to said first-stage nozzle, said transition piece being spaced from said first-stage nozzle;
    a brush seal between said transition piece and said first-stage nozzle sealing the space therebetween, said brush seal including a sealing cap carried by said first-stage nozzle, a portion of said sealing cap overlying said transition piece and defining a gap therewith, said brush seal further including a seal ring carrying a plurality of brush bristles projecting outwardly beyond an edge portion of said ring across said gap and having tips free for engaging said overlying portion of said sealing cap; and
    means carried by said transition piece for mounting said seal ring thereon such that said bristles extend across said gap to seal said space between said transition piece and said first-stage nozzle, said mounting means including a pair of walls projecting outwardly from said transition piece and in spaced opposition to the portion of said sealing cap overlying said transition piece, said seal ring being disposed between said walls with the bristles carried thereby projecting outwardly of said walls with the tips engaging said overlying gap portion, said first-stage nozzle having a slot for receiving and retaining an edge portion of said sealing cap, said sealing cap being angularly formed to project said overlying portion thereof adjacent a distal portion of said walls for engagement with said bristle tips.

11. A gas turbine comprising:
    a first-stage nozzle;
    a combustor having a transition piece for flowing hot gases of combustion from said combustor to said first-stage nozzle, said transition piece being spaced from said first-stage nozzle;
    a brush seal between said transition piece and said first-stage nozzle sealing the space therebetween, said brush seal including a sealing cap carried by said first-stage nozzle, a portion of said sealing cap overlying said transition piece and defining a gap therewith, said brush seal further including a seal ring carrying a plurality of brush bristles projecting outwardly beyond an edge portion of said ring across said gap and having tips free for engaging said overlying portion of said sealing cap; and
    means carried by said transition piece for mounting said seal ring thereon such that said bristles extend across said gap to seal said space between said transition piece and said first-stage nozzle, said transition piece having a pair of walls projecting outwardly therefrom, said sealing cap carried between said walls and projecting therefrom, said first-stage nozzle having a slot for receiving said seal ring with the bristles carried thereby projecting from said seal ring for engagement with the sealing cap.

* * * * *